United States Patent [19]

Murray

[11] Patent Number: 5,119,905
[45] Date of Patent: Jun. 9, 1992

[54] ACCESSORY DRIVE SPLINE LUBRICATION SYSTEM FOR A TURBINE ENGINE REDUCTION GEAR BOX

[75] Inventor: Stephen G. Murray, Indianapolis, Ind.

[73] Assignee: General Motors Corporation, Detroit, Mich.

[21] Appl. No.: 783,467

[22] Filed: Oct. 28, 1991

[51] Int. Cl.⁵ .............................................. F01M 1/08
[52] U.S. Cl. .................................. 184/6.11; 60/39.08; 464/7; 464/16
[58] Field of Search ................... 184/6.11, 6.12, 7.4, 184/7.3; 60/39.08; 464/7, 16, 158

[56] References Cited

U.S. PATENT DOCUMENTS

| | | | |
|---|---|---|---|
| 2,956,824 | 10/1960 | Kuchler et al. | 277/68 |
| 3,085,838 | 4/1963 | Patterson | 384/466 |
| 3,589,471 | 6/1971 | Edge et al. | 184/6 |
| 3,621,937 | 11/1971 | Edge et al. | 464/16 |
| 3,757,535 | 9/1973 | Stein | 464/16 |

Primary Examiner—Ira S. Lazarus
Assistant Examiner—Alan B. Cariaso
Attorney, Agent, or Firm—Donald F. Scherer

[57] ABSTRACT

An accessory drive spline lubrication system for a turbine engine reduction gearbox prevents the continuing loss of engine oil resulting from an ineffective seal between an engine drive shaft and an accessory driven shaft. The spline area is provided with oil by an annular reservoir which is replenished only on startup of the engine. Oil is shot into the annular reservoir within the drive shaft through an orifice in the rotating drive shaft. At operating speeds, the drive shaft rotates sufficiently fast relative to the velocity at which the oil approaches the drive shaft to prevent the oil from entering the drive shaft.

9 Claims, 1 Drawing Sheet

ACCESSORY DRIVE SPLINE LUBRICATION SYSTEM FOR A TURBINE ENGINE REDUCTION GEAR BOX

TECHNICAL FIELD

The present invention relates to the lubrication of drive splines connecting a turbine engine with engine driven accessories.

BACKGROUND OF THE INVENTION

Typically, drive splines between an internally splined turbine engine drive shaft and an externally splined accessory driven shaft are lubricated by a supply of oil trapped in an annular reservoir. The annular reservoir is defined diametrally by an inside surface of the drive shaft defining an outside diameter of the reservoir and an inside diameter of an internal dam defining an inside diameter of the reservoir. The annular reservoir is defined axially by the internal dam within the drive shaft and by a seal between the drive shaft and the driven shaft. The internal dam is located beyond a point of maximum travel of the driven shaft into the drive shaft. The seal is located on an outside diameter of the driven shaft to seal against the drive shaft at a second end of the drive shaft near where the driven shaft enters the drive shaft.

Deterioration or loss of the seal results in oil leaving the annular reservoir. If the oil in the annular reservoir is continuously replenished during the operation of the engine, the fluid supplied to the annular reservoir will flow past the unsealed end of the drive shaft.

SUMMARY OF THE INVENTION

This invention seeks to minimize the potential for oil loss due to lack of an effective seal between a splined drive shaft and a mating splined driven shaft by replenishing the fluid within an annular reservoir only on start-up of the engine, supplying no fluid to the annular reservoir at operating speeds. At low speeds, oil is sprayed in a stream from a stationary nozzle into the annular reservoir through an orifice in the rotating drive shaft. When the drive shaft is rotating at operating speed, the oil is unable to penetrate the orifice in the drive shaft. The oil supplied to the annular reservoir during start-up lubricates the splines. Should the seal between the drive shaft and the driven shaft be ineffective, the oil loss is limited to the amount of oil in the annular reservoir.

It is an object of this invention to provide a lubrication system for a turbine engine accessory drive engagement having a hollow engine drive shaft with internal splines, rotatively supported at a first end and proximate to a second end, with an orifice passing from an inside surface to an outside surface of the drive shaft between the first end and the splines; having an accessory driven shaft with splines which drivingly engage the splines of the drive shaft; having a regulation valve limiting an engine oil pressure within an engine oil supply manifold; having a nozzle for spraying a stream of engine oil, supplied with oil by the engine oil supply manifold, fixed in place relative to the housing, axially located relative to the drive shaft in a direction toward the first end of the drive shaft from the orifice, radially located relative to the drive shaft outside the outside surface of the drive shaft, directing the stream of engine oil toward the center of the internal dam within the drive shaft; and having the drive shaft with the orifice oriented to permit the engine oil to travel from the nozzle past the internal dam when the orifice is between the nozzle and the center of the internal dam, the oil passing through the drive shaft orifice only when the oil stream is traveling at a velocity greater than a critical velocity, the critical velocity increasing with the size of the orifice, and a maximum velocity of the oil being less than a critical velocity of the oil at an idle speed of the drive shaft.

It is also an object of this invention to provide a lubrication system for a turbine engine accessory drive engagement having a hollow engine drive shaft, rotatively supported by a housing near a first end and a second end, with internal splines proximate to the second end and parallel to an axis of rotation, with a plurality of drive shaft orifices passing from an outside surface to an inside surface and located between the splines and the first end, with an annular ring defining an internal dam between the orifices and the splines, and with a constant diameter seal surface in the second end; having an accessory driven shaft which enters the drive shaft from the second end of the drive shaft, with splines drivingly engaged with the splines of the drive shaft; with a circumferential seal retained in a circumferential groove in the accessory driven shaft, axially proximate to the splines of the accessory driven shaft, sealing against the constant diameter seal surface of the drive shaft; having an annular reservoir with an inside diameter defined by the inside diameter of the internal dam and a length defined by an axial distance between the internal dam and the seal; having a regulation valve limiting an engine oil pressure within an engine oil supply manifold; having a plurality of nozzles, each spraying a stream of engine oil, supplied with oil by the engine oil supply manifold, fixed in place relative to the housing, axially located relative to the drive shaft toward the first end, opposite the splines from the orifices, radially located relative to the drive shaft outside the outside surface of the drive shaft, directing the stream of engine oil at a center of the internal dam within the drive shaft; having a restrictor disposed between the oil supply manifold and the nozzles; having a relief valve disposed between the restrictor and the nozzles; and having the drive shaft with the drive shaft orifices oriented to permit engine oil to travel from the nozzles through the internal dam, the oil stream passing through the drive shaft orifices when the oil stream is traveling at a velocity greater than a critical velocity, and a maximum velocity of the oil stream being less than a critical velocity of the oil stream at an idle speed of the drive shaft, the critical velocity of the oil stream (M) in a unit of length per second, defined by a drive shaft rotative speed (X) in revolutions per minute, the drive shaft orifice radius (R) in the unit of length, an inside radius of the engine drive shaft at the orifices ($r_i$) in the unit of length, an outside radius of the engine drive shaft at the orifices ($r_o$) in the unit of length, an angle (Beta) between the stream of engine oil and the axis of rotation of the engine drive shaft, and a ratio of a circumference to a diameter of a circle (Pi), in an equation $$M = (2*X*Pi*(r_o - r_i)) / (60*SIN(Beta)*(SIN^{-1}(R/r_o) + SIN^{-2}(R/r_i))).$$

These and other objects and advantages will be more apparent from the following description and drawings.

DESCRIPTION OF THE PREFERRED EMBODIMENT

Figure 1:
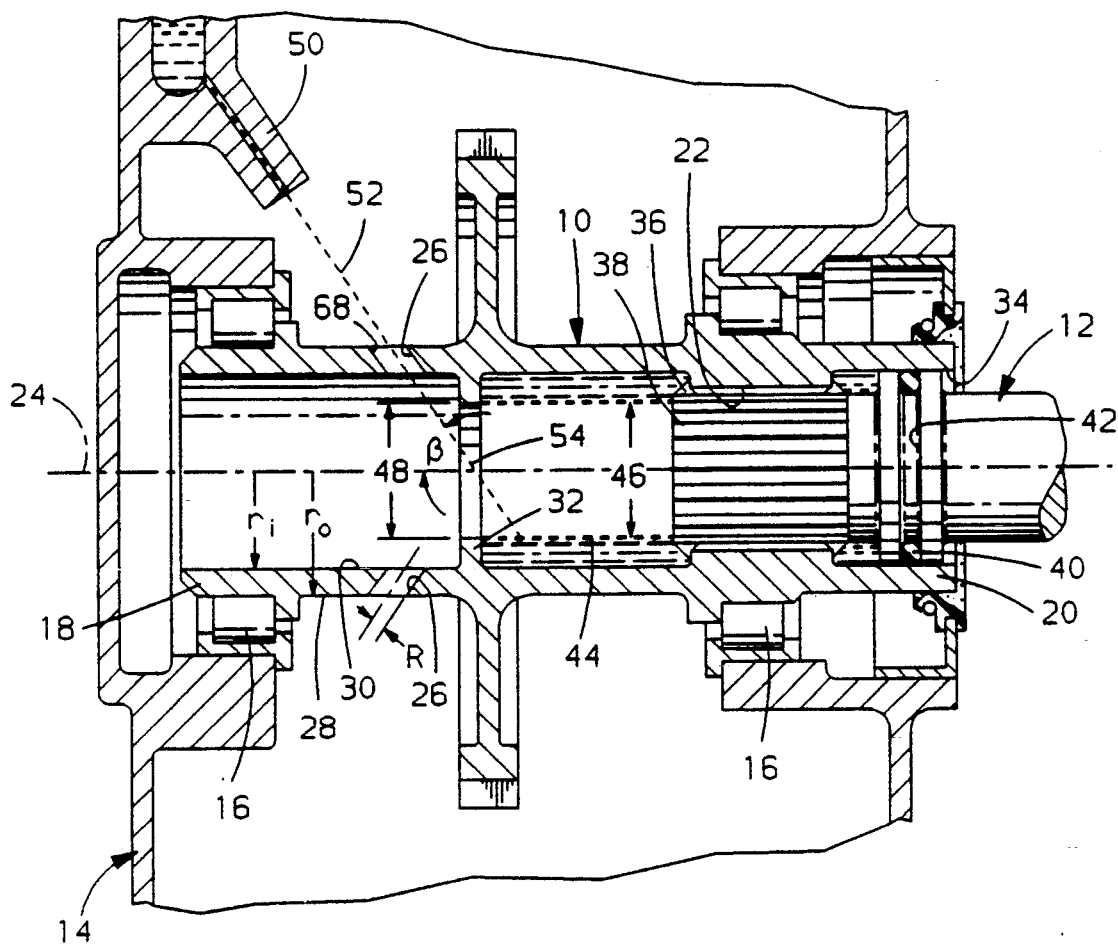
FIG. 1 shows a sectional view of the engagement of an externally splined accessory driven shaft engaged with an engine's internally splined accessory drive shaft.

FIG. 1 shows an internally splined engine drive shaft 10, and an externally splined accessory driven shaft 12, drivingly engaged. The engine drive shaft 10 is rotatively supported by an engine housing 14 with bearings 16 at a first end 18 and inboard of a second end 20.

The engine drive shaft 10 is hollow and open at both the first end 18 and the second end 20. The engine drive shaft 10 has internal splines 22 inboard of the second end 20. The internal splines 22 are parallel to an axis of rotation 24 of the engine drive shaft 10. One or more drive shaft orifices 26 pass from an outside surface 28 of the drive shaft 10 to an inside surface 30 of the drive shaft 10. The orifices 26 are located between the splines 22 and the first end of the drive shaft 18. An annular ring defines an internal dam 32 within the drive shaft 10 between the orifices 26 and the splines 22. The engine drive shaft 10 has a constant diameter seal surface 34 in the second end 20 of the drive shaft 10, outboard of the internal splines 22.

The accessory driven shaft 12 has external splines 36 on a first end 38 complementary with the internal splines 22 of the engine drive shaft 10. The accessory driven shaft 12 has an O-ring seal 40 retained in a circumferential groove 42 axially proximate to the external splines 36. The seal 40 is sized to seal against the seal surface 34 of the drive shaft 10.

The accessory driven shaft 12 is inserted into the engine drive shaft 10 on the second end 20 of the drive shaft 10. The internal splines 22 of the drive shaft 10 drivingly engage the external splines 36 of the driven shaft 12, and the O-ring seal 40 sealingly contacts the seal surface 34 of the drive shaft 10.

An annular reservoir 44 is essentially defined by the seal 40 and the internal dam 32. An inside diameter 46 of the annular reservoir 44 equals an inside diameter 48 of the internal dam 32. The seal 40 and the internal dam 32 establish a length of the annular reservoir 44.

One or more nozzles 50 for spraying a stream of engine oil 52 are directed toward the orifices 26 in the engine drive shaft 10. The nozzles 50 are stationary relative to the housing 14. The nozzles 50 are located axially relative to the drive shaft 10 in a direction of the first end 18 of the drive shaft 10 relative to the orifices 26. The nozzles 50 are located radially relative to the drive shaft 10 outside the outside surface 28 of the drive shaft 10. Each nozzle 50 directs the stream 52 at an angle Beta to the axis 24. The angle Beta is approximately defined by an angle between the axis 24 and a line between the nozzle 50 and a center 54 of the internal dam 32. The orifices 26 are oriented at the angle Beta to the axis 24. A centerline 56 of each orifice 26 coincides with the line between the nozzle 50 and the center 54 of the internal dam 32 once every revolution of the drive shaft 10 as each orifice 26 passes between the nozzles 50 and the center of the internal dam 26. The stream of oil 52 into the annular reservoir 44 is intermittently interrupted by the rotation of the drive shaft 10.

For a given rate of rotation of the drive shaft 10, there is a corresponding oil stream velocity below which the oil stream 52 is not able to penetrate the orifices 26. This is a critical velocity of the oil stream.

The critical velocity is also dependent on the geometry of the drive shaft orifice 26 and the drive shaft 10. A relationship between the critical velocity, the drive shaft geometry, and the rate of rotation of the drive shaft 10 can be summarized by an equation.

The oil stream critical velocity (M) in a unit of length per second is defined by a drive shaft speed (X) in revolutions per minute, an orifice radius (R) in the unit of length, an inside radius of the engine drive shaft at the orifice ($r_i$) in the unit of length, an outside radius of the engine drive shaft at the orifice ($r_o$) in the unit of length, an angle (Beta) between the stream of the engine oil and the axis of rotation of the engine drive shaft, and a ratio of a circumference to a diameter of a circle (Pi), by the equation $$M = (2 \ast X \ast Pi \ast (r_o - r_i)) / (60 \ast SIN(Beta) \ast (SIN^{-1}(R/r_o) + SIN^{-1}(R/r_i))).$$

The velocity of the oil stream 52 out of the nozzle must exceed the critical velocity to replenish the annular reservoir. However, the velocity of the oil stream 52 must be lss than the critical velocity when the drive shaft 10 is rotating at speeds at or above an idle speed to prevent oil from reaching the annular reservoir at drive shaft speeds in an operating range of drive shaft speeds.

Figure 2:
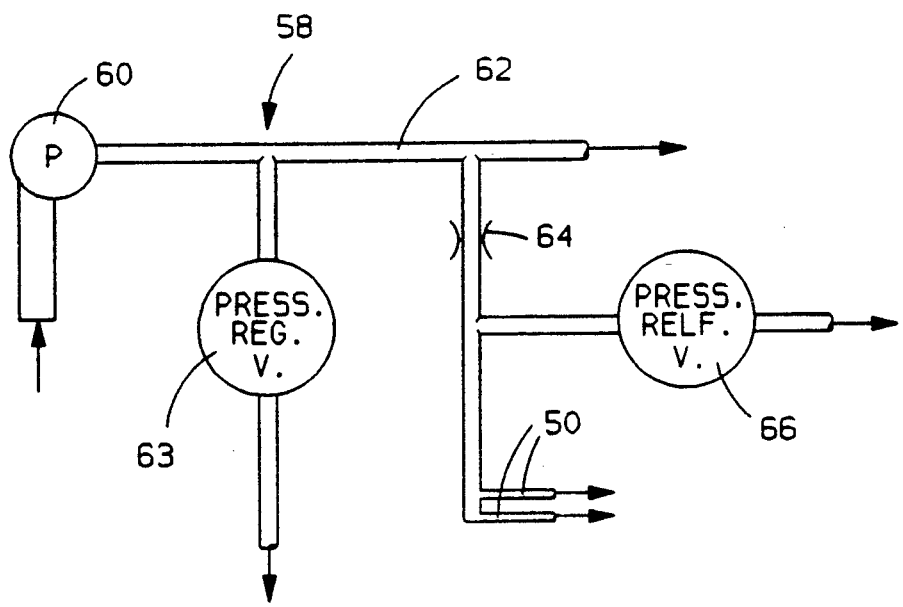
FIG. 2 shows a schematic of a lubrication circuit supplying oil to the nozzle.

A lubrication system 58 as shown in FIG. 2 supplies oil to the nozzles 50. A positive displacement pump 60 is used to pump the oil. A rotative speed of the pump 60 is directly proportional to the rotative speed of the drive shaft 10. The velocity of the oil stream 52 varies approximately linearly With the rotative speed of the pump 60. Oil flows from the pump into an oil supply manifold 62. Pressure regulation of the oil supply manifold 62 by a regulation valve 63 limits the velocity of the oil stream 52 to a corresponding maximum, allowing drive shaft rotative speed to increase without a corresponding increase in oil stream velocity beyond the maximum velocity.

If the pressure at the nozzles 50 is equal to the pressure within the oil supply manifold 62, and the regulation valve 63 for the manifold pressure does not relieve pressure to limit the oil stream velocity to the corresponding maximum before the drive shaft rotative speed reaches idle, then it is necessary to have a restrictor with an orifice 64 and a pressure relief valve 66 interposed between the oil supply manifold 62 and the nozzles 50 as shown in FIG. 2 to reduce the maximum pressure and thereby the maximum oil stream velocity at the nozzles 50.

Systems not requiring the restrictor 64 and the pressure relief valve 66 can set the critical velocity to the desired relationship with drive shaft rotative speed by selecting an appropriate radius size R for the drive shaft orifice 26. The radius R is selected so as to provide a critical velocity less than the oil stream velocity.

Approximate values for one application are:

Engine Idle = 70% of Maximum Engine Drive Shaft Speed;

Regulated Maximum Manifold pressure = 165 pounds per square inch (psi) (at 78.5% of Maximum Engine Drive Shaft Speed);

Pressure Relief Valve Setting = 34.6 psi (at 42% of Maximum Engine Drive Shaft Speed);

Restrictor orifice = 0.056 inches;
Maximum Oil Stream Velocity = 800 inches/second;
Nozzle Size = 0.030 inch Dia.;
Drive Shaft Inside Dia. = 0.96 inches;
Drive Shaft Outside Dia. = 1.28 inches; and
Drive Shaft Orifice Diameter = 0.125 inches.

In this application, the Regulated Maximum Manifold Pressure reaches 165 psi at 78.5% of maximum drive shaft speed. The velocity of the oil stream 52 out of the nozzle 50 would continue to increase linearly with drive shaft rotative speed until the drive shaft rotative speed reached 78.5% of maximum shaft speed. This exceeds the 70% of maximum shaft speed equal to idle speed, allowing oil to reach the annulus and potentially escape the engine in the operating range of drive shaft speeds. To prevent such potential losses, the pressure relief valve 66 and the restrictor 64 with an orifice are employed. The restrictor 64 allows the manifold pressure to be varied independently of the nozzle pressure, but it also has the effect of reducing the oil stream velocity for a given drive shaft speed. If the Regulated Maximum Manifold Pressure had reached a maximum pressure before the drive shaft speed reached idle (70% of maximum drive shaft speed) then it would have been unnecessary to add the restrictor 64 and the pressure relief valve 66.

Both the oil stream velocity and the critical velocity of the oil stream increase with drive shaft speed. The critical velocity of the oil stream 52 increases per the above equation, and the oil stream velocity increases with the speed of rotation of the pump 60 which is directly proportional to the speed of rotation of the drive shaft 10. The oil stream velocity plateaus at 800 inches per second because of the release of pressure at 34.6 psi by the pressure relief valve at approximately 43% of maximum drive shaft speed. The drive shaft 10 is rotating at about 60% of maximum speed when both the critical velocity of the oil stream 52 and the velocity of the oil stream 52 from the nozzle 50 equals 800 inches/second.

At drive shaft speeds below 60% of maximum speed, the oil stream 52 penetrates the drive shaft orifices 26, reaching the annular reservoir 44. The oil stream 52 passes through the drive shaft orifices 26, past the internal dam 32, and into the annular reservoir 44, lubricating the splines 22 and 36. The seal 40 retains the oil in the reservoir 44. As the rotative sped of the drive shaft 10 increases, the oil stream 52 has less time to pass through the rotating drive shaft orifices 26. The velocity of the oil stream 52 exiting the nozzle 50 increases approximately linearly with the drive shaft speed until the drive shaft is rotating at approximately 43% of the maximum drive shaft speed. The increasing velocity of the oil stream 52 allows the oil to continue passing through the drive shaft orifice 26.

The flow of oil into the drive shaft 10 is diminished as the drive shaft speed increases from 43% of the maximum speed to 60% of the maximum speed because the shaft speed is increasing while the oil velocity is remaining constant at 800 inches per second. When the drive shaft speed reaches 60% of maximum speed, and the oil velocity of 800 inches per second equals the critical velocity, oil flow into the drive shaft is effectively terminated. At drive shaft speeds greater than 60% of the maximum speed of the drive shaft, oil entering the rotating drive shaft orifice at the outside surface 28 will be impacted by a wall 68 of the drive shaft orifice 26 before reaching the inside surface 30 of the drive shaft. Because of the centrifugal forces created by the rotation of the drive shaft 10, oil impacting the drive shaft orifice wall 68 will tend to be forced outward through the drive shaft orifice beyond the outer surface 28.

If the seal 40 is not effective, then the oil in the annular reservoir 44 will escape past the seal surface 34 of the drive shaft 10. The potential loss of oil is limited to the oil in the annular reservoir 44 because the annular reservoir 44 is not replenished at operating speeds. The oil stream 52 is unable to penetrate the drive shaft orifices 26 in the drive shaft 10, preventing a continuous loss of oil.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A lubrication system for a turbine engine accessory drive engagement comprising:

an engine drive shaft, being hollow and having an inside surface, being rotatively supported by a housing, having a first end and a second end, having internal splines proximate to the second end and parallel to an axis of rotation, having a drive shaft orifice passing from an outside surface to the inside surface and located between the first end and the splines, having an annular ring defining an internal dam between the orifice and the splines;

an accessory driven shaft, entering the drive shaft from the second end of the drive shaft in line with the axis of rotation, having splines drivingly engaged with the splines of the drive shaft;

a regulation valve limiting an engine oil pressure within an engine oil supply manifold;

a nozzle, for spraying a stream of engine oil, supplied with oil by the engine oil supply manifold, fixed in place relative to the housing, axially located relative to the drive shaft in a direction toward the first end of the drive shaft from the drive shaft orifice, radially located relative to the drive shaft outside the outside surface of the drive shaft, directing the stream of engine oil toward the center of the internal dam within the drive shaft; and the drive shaft having the drive shaft orifice oriented to permit the engine oil to travel from the nozzle past the internal dam when the orifice is between the nozzle and the center of the internal dam, the oil passing through the drive shaft orifice only when the oil stream is traveling at a velocity greater than a critical velocity, the critical velocity increasing with a rotative speed of the drive shaft and decreasing with the size of the drive shaft orifice, and a maximum velocity of the oil stream being less than a critical velocity of the oil stream at an idle speed of the drive shaft.

2. A lubrication system as described in claim 1, further comprising:

a restrictor disposed between the oil supply manifold and the nozzle; and a relief valve disposed between the restrictor and the nozzle.

3. A lubrication system as described in claim 2, further comprising the critical velocity of the oil stream (M) in a unit of length per second, as defined by the drive shaft rotative speed (X) in revolutions per minute, a drive shaft orifice radius (R) in a unit of length, an inside radius of the engine drive shaft at the orifice ($r_i$) in this unit of length, an outside radius of the engine drive shaft at the orifice ($r_o$) in the unit of length, an angle (Beta) between the stream of engine oil and the axis of rotation of the engine drive shaft, and a ratio of a circumference to a diameter of a circle (Pi), in an equation $$M = (2*X*Pi*(r_o - r_i)) / (60*SIN(Beta)*(SIN^{-1}(R/r_o) + SIN^{-1}(R/r_i))).$$

4. A lubrication system for a turbine engine accessory drive splined engagement comprising:

- an engine drive shaft, being hollow and having an inside surface, being rotatively supported by a housing, having a first end and a second end, having internal splines proximate to the second end and parallel to an axis of rotation, having a drive shaft orifice passing from an outside surface to the inside surface and located between the splines and the first end, having an annular ring defining an internal dam between the orifice and the splines;
- an accessory driven shaft, entering the drive shaft from the second end of the drive shaft, having splines drivingly engaged with the splines of the drive shaft;
- a regulation valve limiting an engine oil pressure within an engine oil supply manifold;
- a nozzle, for spraying a stream of engine oil, supplied with oil by the engine oil supply manifold, fixed in place relative to the housing, axially located relative to the drive shaft toward the first end, opposite the splines from the orifice, radially located relative to the drive shaft outside the outside surface of the drive shaft, directing the stream of engine oil at a center of the internal dam within the drive shaft; and
- the drive shaft having the drive shaft orifice oriented to permit engine oil to travel from the nozzle through the internal dam, the oil stream passing through the drive shaft orifice when the oil stream is traveling at a velocity greater than a critical velocity, and a maximum velocity of the oil being less than a critical velocity of the oil at an idle speed of the drive shaft, the critical velocity of the oil stream (M) in a unit of length per second, defined by a drive shaft rotative speed (X) in revolutions per minute, the drive shaft orifice radius (R) in the unit of length, an inside radius of the engine drive shaft at the orifice ($r_i$) in the unit of length, an outside radius of the engine drive shaft at the orifice ($r_o$) in the unit of length, an angle (Beta) between the stream of engine oil and the axis of rotation of the engine drive shaft, and a ratio of a circumference to a diameter of a circle (Pi), in an equation $$M = (2*X*Pi*(r_o - r_i)) / (60*SIN(Beta)*(SIN^{-1}(R/r_o) + SIN^{-1}(R/r_i))).$$

5. A lubrication system as described in claim 4, further comprising:

- a restrictor disposed between the oil supply manifold and the nozzle; and
- a relief valve disposed between the restrictor and the nozzle.

6. A lubrication system as described in claim 5, further comprising:

- a constant diameter seal surface in the second end of the drive shaft;
- a circumferential seal retained in a circumferential groove in the accessory driven shaft, axially proximate to the splines of the accessory driven shaft, sealing against the constant diameter seal surface of the drive shaft; and
- an annular reservoir with an inside diameter defined by the inside diameter of the internal dam and a length defined by an axial distance between the internal dam and the seal.

7. A lubrication system for a turbine engine accessory drive splined engagement comprising:

- an engine drive shaft, being hollow and having an inside surface, being rotatively supported by a housing, having a first end and a second end, having internal splines proximate to the second end and parallel to an axis of rotation, having a plurality of drive shaft orifices passing from an outside surface to the inside surface and located between the splines and the first end, having an annular ring defining an internal dam between the orifices and the splines;
- an accessory driven shaft, entering the drive shaft from the second end of the drive shaft, having splines drivingly engaged with the splines of the drive shaft;
- a regulation valve limiting an engine oil pressure within an engine oil supply manifold;
- a plurality of nozzles, each for spraying a stream of engine oil, supplied with oil by the engine oil supply manifold, fixed in place relative to the housing, axially located relative to the drive shaft toward the first end, opposite the splines from the orifices, radially located relative to the drive shaft outside the outside surface of the drive shaft, directing the streams of engine oil at a center of the internal dam within the drive shaft; and
- the drive shaft having the drive shaft orifices oriented to permit the engine oil to travel from the nozzles through the internal dam, the oil stream passing through the drive shaft orifices when the oil streams are traveling at a velocity greater than a critical velocity, and a maximum velocity of the oil being less than a critical velocity of the oil at an idle speed of the drive shaft, the critical velocity of the oil streams (M) in a unit of length per second, defined by a drive shaft rotative speed (X) in revolutions per minute, the drive shaft orifice radius (R) in the unit of length, an inside radius of the engine drive shaft at the orifices ($r_i$) in the unit of length, an outside radius of the engine drive shaft at the orifices ($r_o$) in the unit of length, an angle (Beta) between the stream of engine oil and the axis of rotation of the engine drive shaft, and a ratio of a circumference to a diameter of a circle (Pi), in an equation $$M = (2*X*Pi*(r_o - r_i)) / (60*SIN(Beta)*(SIN^{-1}(R/r_o) + SIN^{-1}(R/r_i))).$$

8. A lubrication system as described in claim 7, further comprising:

- a restrictor disposed between the oil supply manifold and the nozzles; and a relief valve disposed between the restrictor and the nozzles.

9. A lubrication system as described in claim 8, further comprising:
- a constant diameter seal surface in the second end of the drive shaft;
- a circumferential seal retained in a circumferential groove in the accessory driven shaft, axially proximate to the splines of the accessory driven shaft, sealing against the constant diameter seal surface of the drive shaft; and
- an annular reservoir with an inside diameter defined by the inside diameter of the internal dam and a length defined by an axial distance between the internal dam and the seal.

* * * * *